United States Patent [19]

Kimura

[11] Patent Number: 4,776,743

[45] Date of Patent: Oct. 11, 1988

[54] LEAD-FRAME SEPARATING APPARATUS

[75] Inventor: Hideo Kimura, Otsu, Japan

[73] Assignee: Nichiden Machinery, Limited, Otsu, Japan

[21] Appl. No.: 87,156

[22] Filed: Aug. 19, 1987

[30] Foreign Application Priority Data

Oct. 13, 1986 [JP] Japan .................................. 61-243975

[51] Int. Cl.$^4$ .............................................. B65G 59/06
[52] U.S. Cl. ..................... 414/128; 221/267; 221/277; 271/101; 271/105; 271/169; 271/268; 414/126; 414/129
[58] Field of Search ............... 414/125, 126, 128, 129, 414/131; 221/220, 251, 267, 277; 271/101, 105, 169, 268

[56] References Cited

U.S. PATENT DOCUMENTS

| 3,155,244 | 11/1964 | Rogers et al. | 414/128 X |
| 3,278,078 | 10/1966 | Kister | 221/251 X |
| 3,997,067 | 12/1976 | Murata | 414/126 |
| 4,135,710 | 1/1979 | Seragnoli | 414/128 X |
| 4,168,772 | 9/1979 | Eberle | 221/251 X |
| 4,273,321 | 6/1981 | Luther et al. | 414/131 X |
| 4,690,395 | 9/1987 | Nowicki | 271/105 X |
| 4,696,715 | 9/1987 | Bahr | 414/129 X |

FOREIGN PATENT DOCUMENTS 115189 9/1969 Denmark ............................ 271/101

Primary Examiner—Leslie J. Paperner
Attorney, Agent, or Firm—W. G. Fasse; D. H. Kane, Jr.

[57] ABSTRACT

A lead-frame separating apparatus includes an inclined stationary stocker placed with a plurality of rectangular sheet-type lead-frames in alignment, and a chuck unit capable of taking two positions consisting of a stand-by position above conveying rails where it swings within a vertical plane and extends beneath the stocker, and a chuck position where it adjoins the first lead-frame on the stocker. At the chuck position, the chuck unit holds and takes out the first lead-frame, which is released at the stand-by position and transferred onto the conveying rails.

8 Claims, 7 Drawing Sheets

LEAD-FRAME SEPARATING APPARATUS

BACKGROUND OF THE INVENTION

1. Field of the Invention

The present invention relates to a handling apparatus of a lead-frame used in resin sealed electronic components. More specifically, it relates to an apparatus which separates and takes out the lead-frame one by one from a plurality of lead-frames stacked in alignment.

2. Description of the Prior Art

In resin sealed or packaged type components such as capacitors, semiconductor devices or the like, resin molding using a rectangular sheet-type metal lead-frame is employed. For example, in a production process and pellet mounting process of the semiconductor device, a sheet of lead-frame is separated one by one from a column of lead-frames supplied in a stacked state and conveyed to the next process. As means for separating the lead-frame one by one, a vacuum suction or magnetic suction has been known. In such conventional separating means, the top lead-frame is sucked and separated with a vacuum suction pad or a magnet chuck from above the stacked lead-frame and conveyed to the pellet mounting position. The column of stacked lead-frames is placed on an elevating mechanism and lifted at the end of every separation aforementioned so that the top layer of lead-frame takes a prescribed position. Then, after the last lead-frame has been taken out, the elevating mechanism is descended to the initial position to repeat the above separating operation after supplying the new stacked lead-frames.

The lead-frame is formed by etching or pressing a metal sheet material. Accordingly, when a number of lead-frames processed by etching are stacked, a total weight is increased and it sticks together so closely that its separation is sometimes difficult. Also, when the lead-frame is processed by pressing, burrs produced at pressing were caught by the adjacent lead-frame. Therefore, by means of vacuum suction pad or magnet chuck, it is difficult to separate only one sheet from the stocked lead-frame, frequently resulted in such an accident as taking out a few lead-frames sticking to each other. Besides, in this case, it was also dangerous that an excessive lead-frame will drop while being transferred to the following process.

Also, in the separating means utilizing the vacuum suction pad or magnet chuck, since the top layer of lead-frame must be picked up from above the stocked lead-frame, the elevating mechanism or the like for arranging the top layer always at the prescribed position is required, thus complication and enlargement of the apparatus itself is unavoidable. In addition, the new lead-frame cannot be supplied during the separating operation, but only after the whole lead-frames are taken out and the elevating mechanism is descended and returned to the initial position, resulted in a considerable deterioration of the operability. Furthermore, the lead-frame has various sizes giving different locations to be sucked by the vacuum suction pad or magnet chuck depending on kinds, so that the sucking position must be changed accordingly, thus a flexible adaptability to various lead-frames was difficult.

SUMMARY OF THE INVENTION

It is the primary object of the present invention to provide a lead-frame separating apparatus capable of solving problems aforementioned.

It is another object of the present invention to provide a lead-frame separating apparatus capable of taking out a lead-frame sequentially one by one surely and stably from a plurality of aligned lead-frames.

It is a further object of the present invention to provide a lead-frame separating apparatus having a compact and simple construction as a whole without requiring a specific device such as an elevating mechanism.

It is still another object of the present invention to provide a lead-frame separating apparatus capable of supplying new lead-frames at any time even during operation.

It is an additional object of the present invention to provide a lead-frame separating apparatus capable of corresponding to various lead-frames rapidly and easily.

According to one embodiment of the present invention, the lead-frame separating apparatus includes a base, a flat stocker placed with a plurality of lead-frames inclined relative to the horizontal plane in alignment, and downward by gravity, a lower frame stopper projected from the front end of the stocker for catching the lower edge of the first lead-frame, an upper frame stopper for elastically holding the upper edge of the first lead-frame, a separator unit disposed in the vicinity of the upper frame stopper for partly separating the upper edge of the first lead-frame from the succeeding lead-frame, a chuck unit movable between the standby and chuck positions for gripping the first lead-frame partly separated by the separator at the chuck position, a main holder arranged movably vertically on the stocker in the vicinity of the upper edge of the first lead-frame for supporting it at the advanced position, and a sub-holder arranged movably vertically relative to the stocker in the vicinity of the separator, and inserted between the first lead-frame partly separated by the separator and the succeeding lead-frame at the advanced position to hold the latter temporarily.

According to the lead-frame separating apparatus of the present invention, the upper edge of the first lead-frame of a plurality of lead-frames aligned on the stocker is partly separated by the rotation of the separator engaged therewith by a separating groove. After the first lead-frame is partly separated by the separator, the upper edge is held by a chuck pawl to separate and take out the first lead-frame from the succeeding lead-frame, and at the same time, the sub-holder is inserted therebetween to support the latter temporarily. Thereby, the lead-frames can be taken out one by one with certainty from the plurality of aligned lead-frames.

These and other objects and features of the present invention will become more apparent from the following description with reference to the accompanying drawings.

DESCRIPTION OF THE PREFERRED EMBODIMENT

A lead-frame separating apparatus embodying the present invention will be explained with reference to FIG. 1 through FIG. 11.

Figure 1:
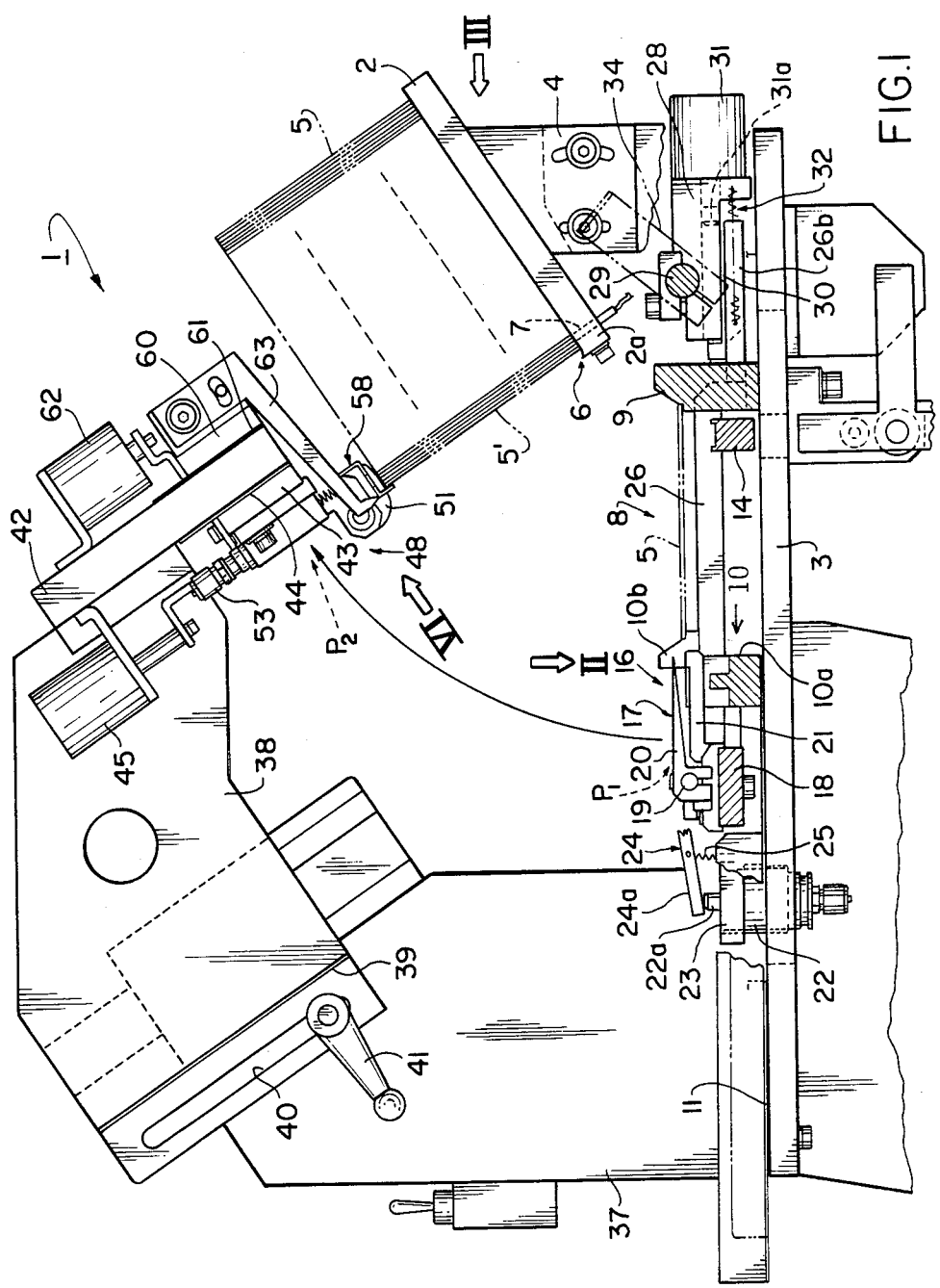
FIG. 1 is a front view of a lead-frame separating apparatus as a specific example of the present invention.
Figure 2:
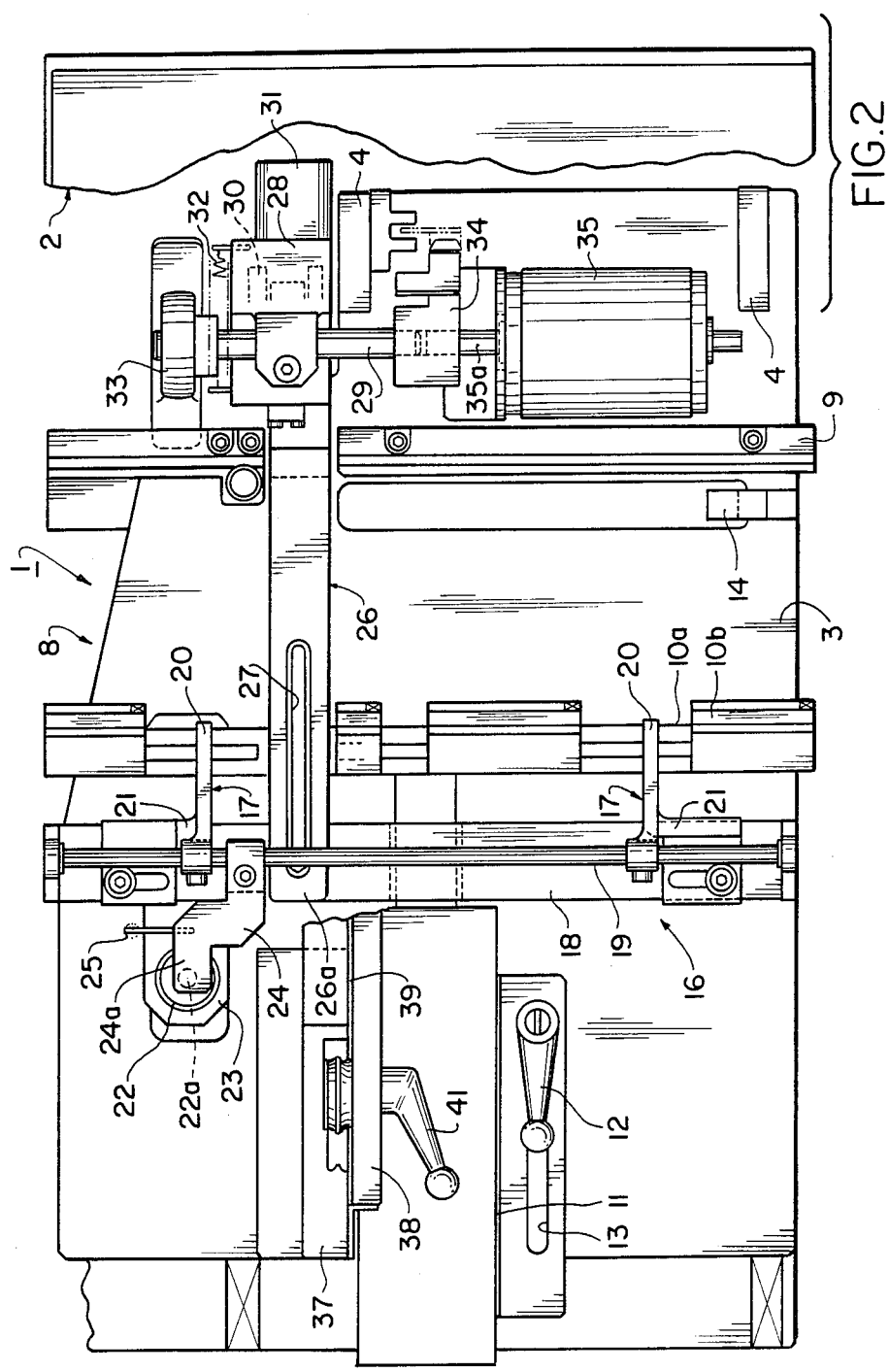
FIG. 2 is a view taken in the direction of the arrow II of FIG. 1.
Figure 3:
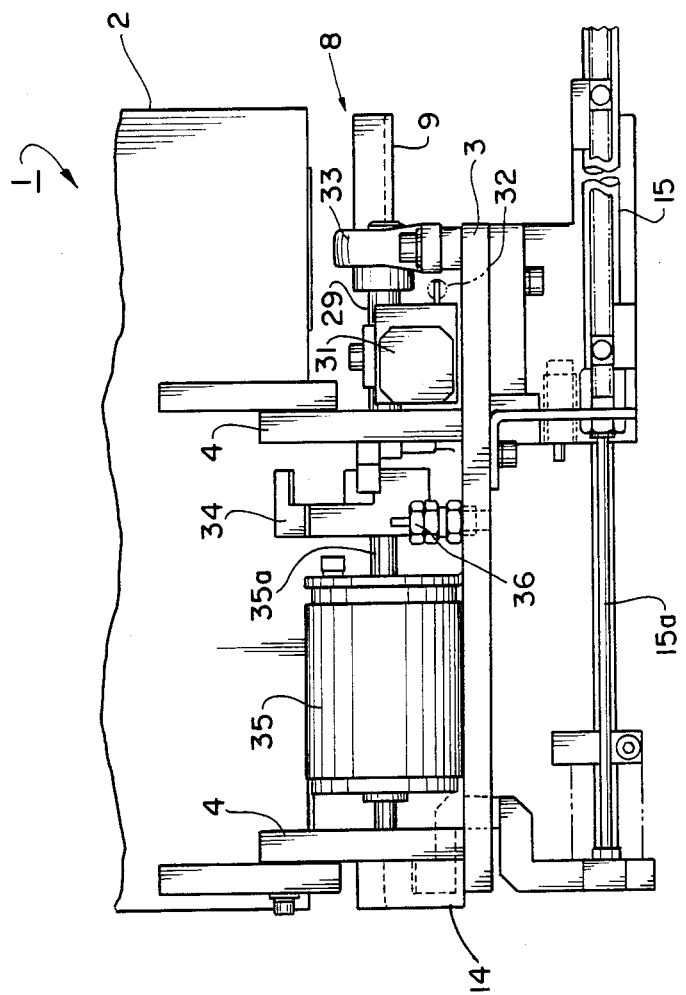
FIG. 3 is a view taken in the direction of the arrow II of FIG. 1.
Figure 4:
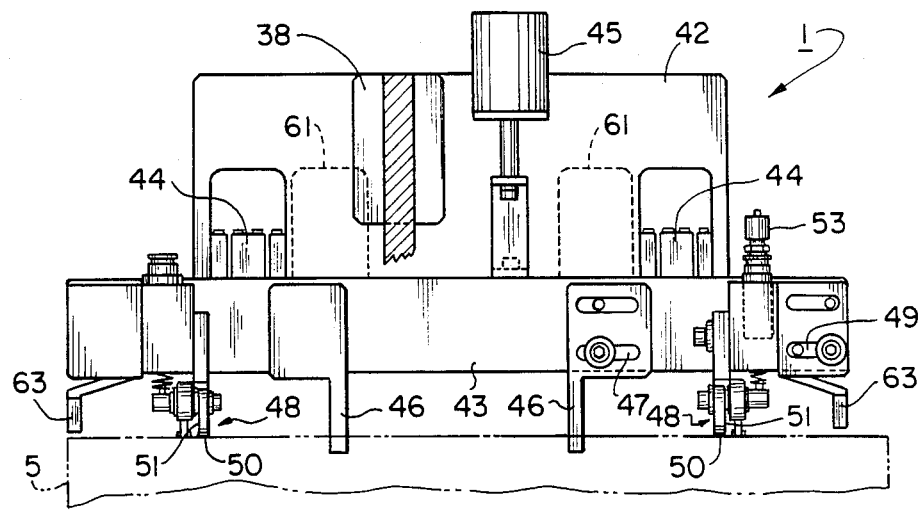
FIG. 4 is a view taken in the direction of the arrow IV of FIG. 1.

Referring first to FIG. 1 and FIG. 2, the lead-frame separating apparatus (1) includes a flat stocker (2) arranged in inclination at a prescribed angle via a support frame (4) disposed vertically at one side end of a base (3). On the stocker (2), a plurality of lead-frames (5) are placed in alignment as shown by imaginary lines. The inclined angle of the stocker (2) is adjustable and set in such a way that the succeeding lead-frame drops rapidly on the stocker (2) by gravity at separation of the first lead-frame to be described later. A lower frame stopper (6) projected from the front end (2a) of the stocker (2) longitudinally of the lead-frame (5) or in the direction normal to the paper surface of FIG. 1, catches the lower edge of the first lead-frame (5') on the stocker (2) and restricts its position. In the vicinity of the front end of the stocker (2), a reflex photoelectric sensor (7) is buried to detect presence of the lead-frame (5) on the stocker (2) for checking remaining lead-frames.

Conveying rails (8) traversing generally at the center portion of the base (3) comprise a stationary guide rail (9) and a movable guide rail (10) spaced from each other in parallel by the width of the lead-frame and extending longitudinally along the lead-frame (5), a sheet of which, separated from the stocker (2), is adapted to be placed over the rails. The movable guide rail (10) is mounted on the base (3) slidably in the direction traversing the conveying rails (8) via a cross roller guide (11), and by loosening a clamp lever (12) and moving the movable guide rail (10) within the range of a slot (13), the distance between the stationary guide rail (9) can be changed so as to be adaptable to the lead-frame having a different width. Also, the movable guide rail (10) is constituted by a movable rail (10a) mounted on the cross roller guide (1) and a plurality (4 in the drawing) of movable guides (10b) freely slidable longitudinally on the movable rail (10a), and by adjusting the relative position with a chuck pawl (17), adaptability to the lead-frame (5) having a different length is made possible. Between the stationary guide rail (9) and movable guide rail (10), there is provided a pusher (14), which is, as clearly seen in FIG. 3, linked to the tip of a rod (15a) of a cylinder (15) fixed under the base (3), and by reciprocating the pusher (14) in the direction of the conveying rails (8), the lead-frame (5) placed thereon is transferred to the following process.

The reference numeral (16) generally indicates a chuck unit, which includes the chuck pawl (17) arranged at a plurality of locations, two of which are shown in the drawing, in the vicinity of the movable guide rail (10). Each chuck pawl (17) is constituted by an upper chuck (20) fixed to a shaft (19) supported rotatably on a chuck base (18) and extending in parallel to the movable guide rail (10) at the base end, and a lower chuck (21) screwed to the chuck base (18) at the base end. In addition, the upper and lower chucks (20), (21) are respectively slidable relative to the shaft (19) and chuck base (18) in the direction of the movable rail (10) so as to be adaptable to the lead-frame (5) having various sizes. Between free ends of this pair of upper and lower chucks (20), (21), the upper edge of the lead-frame (5) is clamped. That is to say, usually, to the tip of a rod (22a) of a chuck pawl open and close cylinder (22) mounted to an extending portion (23) forming a part of the chuck base (18), a free end (24a) of an open and close lever (24) secured to the shaft (19) at the base end is contacted by the elastic force of a spring (25) disposed between the extending portion (23) and the lever (24), and the upper and lower chucks (20), (21) are separated from each other. When the rod (22a) is projected, the upper chuck (20) is pivoted about the shaft (19) until its tip contacts that of the lower chuck (21).

The chuck base (18) is secured to the tip (26a) of a swing lever (26) mounted laterally in the direction orthogonal to the conveying rails (8) in such a manner that its position can be adjusted by a slot (27). A base end (26b) of the swing lever (26) is fixed to a shaft (29) supported rotatably on the base (3) through a bearing (33) and extending in parallel to the stationary guide rail (9) via a rotary block (28).

The end on the opposite side of the bearing member (33) of the shaft (29) supporting the rotary block (28) is coupled to an output shaft (35a) of a rotary actuator (35) fixed to the base (3) via a lever (34). The rotary actuator (35) rotates the shaft (29) to swing the swing lever (26) upward and to move chuck pawls (17), of the chuck unit (16) at the stand by position $P_1$ to the chuck position $P_2$ or vice versa. In this case, the tip of the lever (34) supported by the output shaft (35a) is contacted to a stopper (36) on the base (3) to restrict an ascending end position of the swing lever (26). Between the base end (26b) of the swing lever (26) and the rotary block (28), a cross roller guide (30) is interposed to allow the swing lever (26) to slide in the direction orthogonal to the conveying rails (8). Also, to the rotary block (28), a chuck pawl in and out cylinder (31) is mounted, and the base end (26b) of the swing lever (26) is usually contacted to a rod (31a) of the cylinder (31) by an elastic force of a spring (32) disposed between the rotary block (28).

On the base (3) on the opposite side of the stocker (2) interposing the conveying rails (8) therebetween, a first support frame (37) is installed vertically whereon a second support frame (38) is mounted slidably in the direction orthogonal to the inclined direction of the stocker (2) via a cross roller guide (39). The second support frame (38) is fastened to the first support frame (37) by means of a bolt inserted through a slot (40), and by operating a clamp lever (41), the relative position therebetween can be adjusted. To the tip of the second support frame (38), a flat holder base (42) is secured and under its tip longitudinally along the lead-frame (5), a long and flat main holder base (43) is mounted slidably via cross roller guides (44), so as to slide in the direction orthogonal to the inclined direction of the stocker (2) by a main holder cylinder (45) fixed to the holder base (42). As is apparent from FIG. 4, at a plurality of locations (2 in the drawing) on the main holder base (43), main holders (46) whose position is adjustable corresponding to the kind of lead-frame (5) by a slot (47) are screwed, and their tips hold the first lead-frame (5') on the stocker (2) to support the lead-frame (5).

Figures 5, 6, 7:
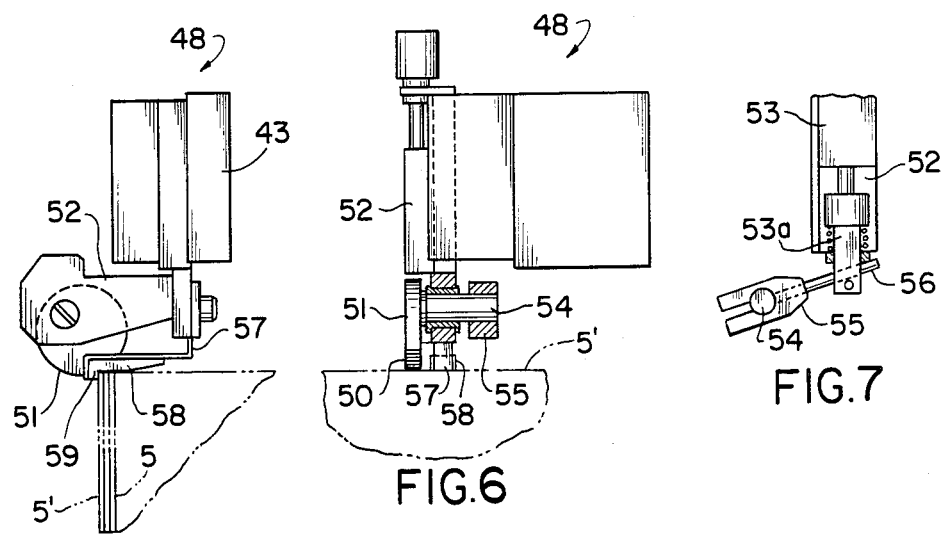
FIG. 5 is an enlarged front view of a separator unit in the apparatus of FIG. 1.
FIG. 6 is a side view of the separator unit of FIG. 5.
FIG. 7 is a front view of a driving mechanism in the separator unit of FIG. 5.

Separator units (48) disposed on the main holder base (43) outside the main holders (46) are screwed in such a manner that its position can be adjusted by a slot (49) corresponding to the kind of lead-frame (5) as same as the main holder (46). In each separator unit (48), as shown in FIG. 5 through FIG. 7, a separator (51) formed with a plurality of fine separating grooves (50) extending in parallel to each other axially and partly on the periphery is supported rotatably and eccentrically on a mounting frame (52), and rod (53a) of a separator cylinder (53) fixed to the mounting frame (52) is linked to a pin (56) extending from a block (55) secured to a rotary shaft (54) of the separator (51). Also, an upper frame stopper (58) is mounted to a portion of the mounting frame (52) via a plate spring (57) and arranged at a position opposing the lower frame stopper (6) of the stocker (2) aforementioned. A holder (59) disposed at the tip of the upper frame stopper (58) holds the upper edge of the first lead-frame (5') on the stocker 2 elastically by a plate spring (57) to restrict its position. Here, when separating the lead-frame to be described later, in order to separate the upper edge of the first lead-frame (5') partly from the succeeding lead-frame by rotating the separator (51), the relative position between the center of rotation of the separator (51) and the upper edge of the first lead-frame (5') must be set precisely, therefore, by restricting the upper edge position of the first lead-frame (5') with the upper frame stopper (58), the separator (51) ensures a reliable and stable partial separation of the first lead-frame (5'). On the upper surface of the tip of the holder base (42), a long and flat sub-holder base (60) is mounted longitudinally along the lead-frame (5) slidably via cross roller guides (61), and moved back and forth with a sub-holder cylinder (62) fixed to the holder base (42). Tips of a pair of sub-holders (63) mounted at both ends of the sub-holder base (60) are inserted between the first and succeeding lead-frames (5'), (5) on the stocker (2), and functioned to separate the former as well as to support the latter temporarily.

Operation of the lead-frame separating apparatus (1) constructed as aforementioned will be explained with reference to FIG. 1 through FIG. 7, and particularly to FIG. 8 through FIG. 11.

Figure 8:
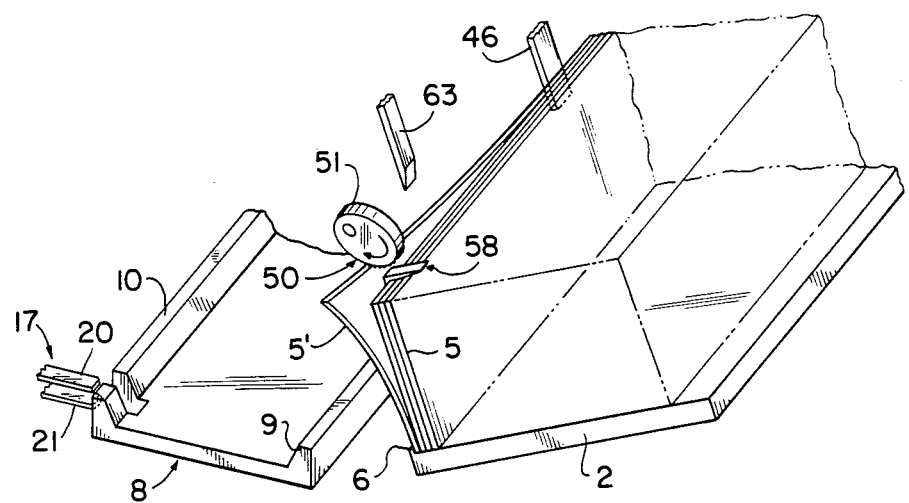
FIG. 8 through FIG. 11 are diagrammatic perspective views for illustrating each operating condition of the apparatus of FIG. 1.

Referring first to an initial state shown in FIG. 1, a plurality of lead-frames (5) are placed on the stocker (2) in alignment. At this time, the first lead-frame (5') is supported by the main holder (46) and at the same time, the lower edge is positioned by the lower frame stopper (6) of the stocker (2) and the upper edge by the upper frame stopper (58) of the separator unit (48). From this state, as shown in FIG. 8, the separator (51) contacting the upper edge of the first lead-frame (5') on the stocker (2) is rotated by a constant pitch with the separator cylinder (53). Thereby, the upper edge of the first lead-frame (5') is caught in the separating groove (50) of the separator (51), and the upper edge of the first lead-frame (5') positioned by the upper frame stopper (58) is slightly turned against the elastic force of the upper frame stopper (58) within a scope of elastic deformation and separated partly from the succeeding lead-frame (5).

Figure 9:
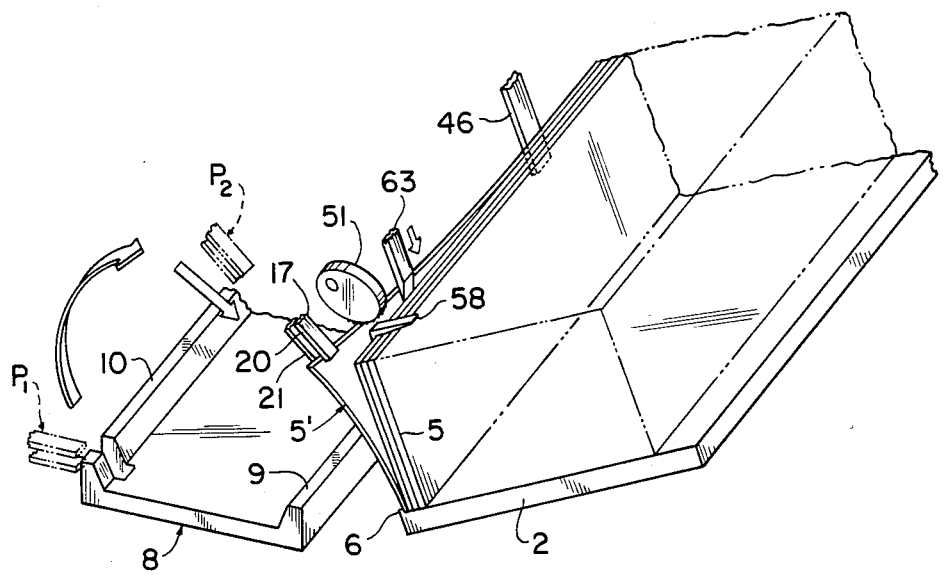

Next, as shown in FIG. 9, the chuck unit (16) at the stand by position $P_1$ is arranged at the chuck position $P_2$ by swinging the swing lever (26) with the rotary actuator (35). At this time, the chuck pawls (17) is moved forward by the chuck pawl in-out cylinder (31) via the swing lever (26), and the upper edge of the first lead-frame (5') partly separated by the separator (51) is arranged between the upper chucks (20) and the lower chucks (21). Simultaneously with in-operation of such chuck pawls (17), the sub-holders (63) is advanced by the sub-holder cylinder (62) on the holder base (42) and inserted between the first lead-frame (5') partly separated by the separator (51) and the succeeding lead-frame (5).

Figure 10:
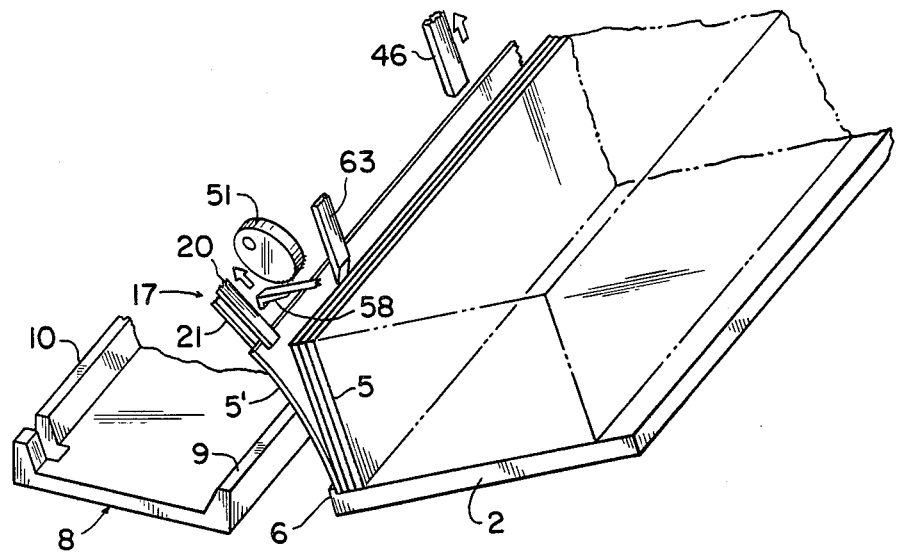

Then, as shown in FIG. 10, the shaft (19) is rotated by the chuck pawl open and close cylinder (22) via the open and close lever (24) to close the chuck pawls (17) and to clamp the upper edge of the first lead-frame (5'). Then, by the main holder cylinder (45) on the holder base (42), the main holders (46) on the main holder base (43) and the separators (51) of the separator units (48) are retreated. At this time, the first lead-frame (5') on the stocker (2) is held by the chuck pawls (17) and the succeeding lead-frame (5) is supported by the sub-holders (63).

Figure 11:
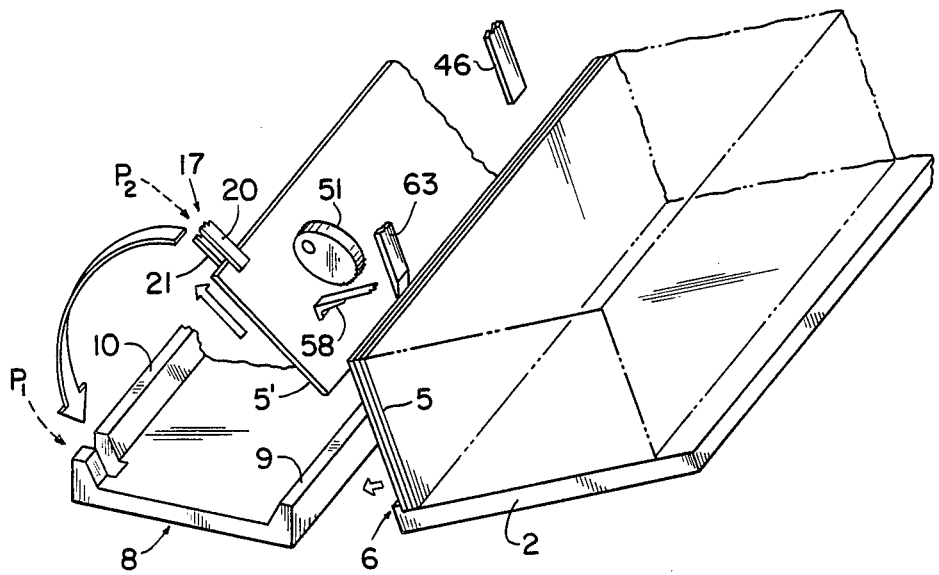

From this state, as shown in FIG. 11, the chuck pawls (17) are retreated by the chuck pawl in-out cylinder (31) via the swing lever (26), and the first lead-frame (5') held by the chuck pawls (17) is pulled out and separated from the lower frame stopper (6) of the stocker (2). After such out-operation of the chuck pawls (17), the swing lever (26) is swung by the rotary actuator (35) to return the chuck unit (16) to the stand-by position $P_1$ from the chuck position $P_2$, and the lead-frame (5') is placed on the guide rails (9) (10) of the conveying rails (8).

By reversing the rod (15a) of the cylinder (15) from this state after opening the chuck pawls (17) by the chuck pawl open and close cylinder (22), the lead-frame (5') is transferred by the pusher (14) to the following process along the guide rails (9) (10).

During restoring operation of the chuck unit (16) mentioned above, the main holders (46) and the separators (51) of the separator units (48) are moved forward by the main holder cylinder (45) on the holder base (42), and thereafter, the sub-holders (63) are retreated by the sub-holder cylinder (62) on the holder base (42). Thereby, the succeeding lead-frame (5) on the stocker (2) supported by the sub-holders (63) slides on the inclined stocker (2) by gravity and is caught by the main holders (46) to indicate the initial state of FIG. 1 aforementioned.

Figure 12:
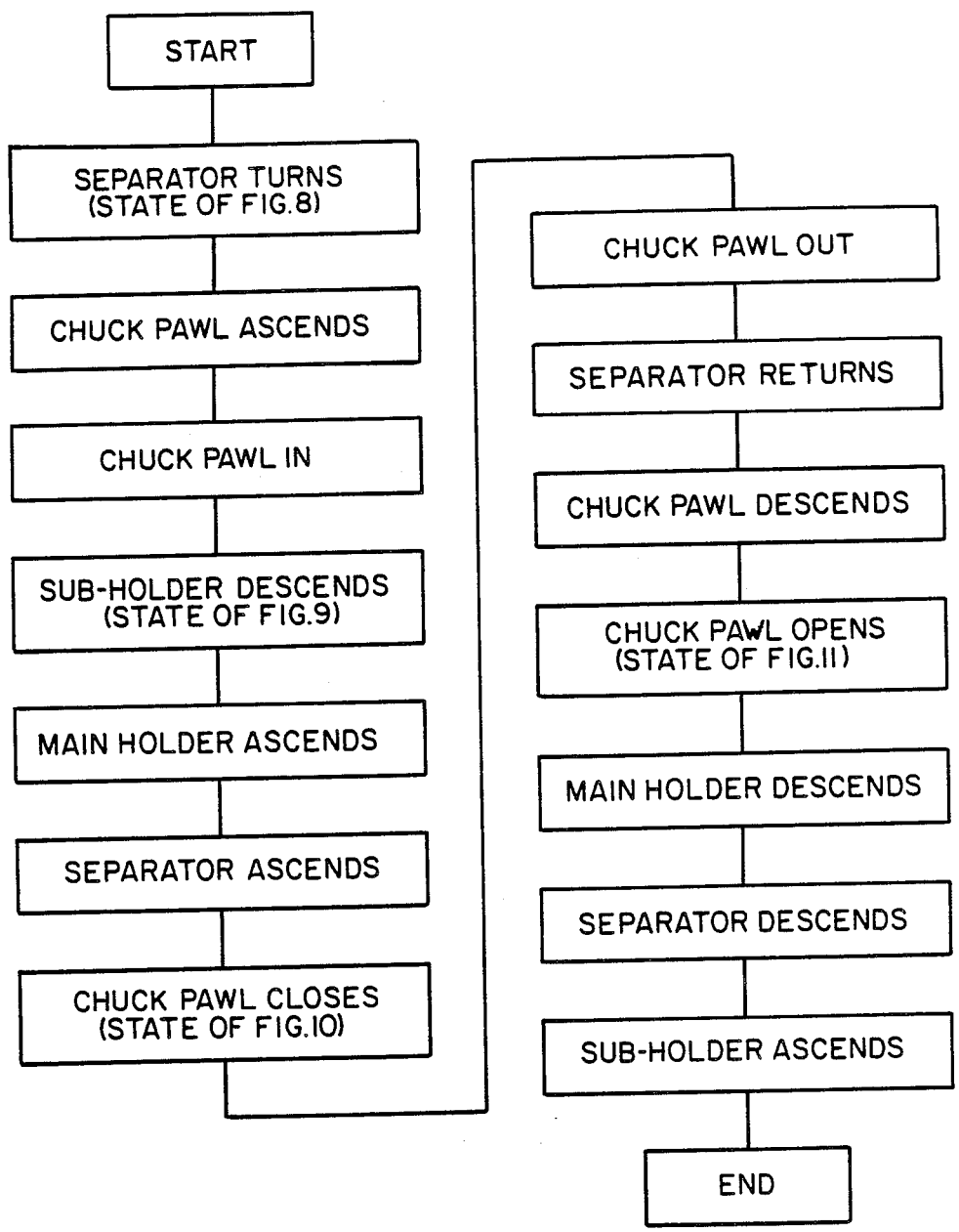
FIG. 12 is a flow chart showing a series of operation of the lead-frame separating apparatus.

A series of operations as mentioned above can be summarized as shown in FIG. 12, and by repeating this operation, the lead-frame (5) on the stocker (2) is surely separated one by one sequentially from the first lead-frame (5') and transferred onto the conveying rails (8) for the following process.

As described heretofore, according to the present invention, since a plurality of lead-frames on the stocker can be separated surely and stably one by one sequentially from the first lead-frame, a rapid and smooth transportation of the lead-frame to the following process is possible. Also, from the aligned lead-frame, the first one is taken out so that a take out position is always constant, thus a conventional elevating mechanism or the like is not necessary and the apparatus can be simplified and minimized, in addition, workability can be improved since the lead-frame can be supplied at any time even during the separating operation moreover, the lead-frame separating apparatus having a large practical value corresponding easily to the lead-frame irrespective of its size may be provided.

What is claimed is:

1. A lead-frame separating apparatus including,
   a base,
   a plate stocker placed with a plurality of lead-frames inclined relative to the horizontal plane in alignment, and mounted to said base such that the lead-frame is movable downward by gravity,
   a lower frame stopper projected at the front end of said stocker to catch the lower edge of the first lead-frame,
   an upper frame stopper elastically holding the upper edge of the first lead-frame,
   a separator unit disposed in the vicinity of said upper frame stopper for partly separating the upper edge of the first lead-frame from the succeeding lead-frame,
   a chuck unit which is movable between stand-by and chuck positions for holding the first lead-frame partly separated by said separator at the chuck position,
   a main holder disposed movable vertically relative to said stocker in the vicinity of the upper edge of the first lead-frame for supporting the first lead-frame at the advanced position, and
   a sub-holder disposed movably vertically relative to the lead-frame placing surface of said stocker in the vicinity of said separator, and inserted between the first lead-frame partly separated by said separator and the succeeding lead-frame at the advanced position to temporarily support the latter.

2. An apparatus in accordance with claim 1, wherein an inclined angle of said stocker is adjustable.

3. An apparatus in accordance with claim 1, wherein an upper frame support, separator unit, main holder and sub-holder are mounted to a support frame means installed vertically on a base so as to be adjustable in vertical and/or horizontal direction relative to a stocker.

4. An apparatus in accordance with claim 1 comprising a conveying means having a pair of rails disposed on the base and extending in parallel to each other, wherein said chuck unit is capable of swinging about a first shaft supported rotatably on the base to take two positions of the stand-by position and the chuck position, in which the first lead-frame aligned on said stocker is held, and in the stand-by position, said lead frame is placed between said pair of rails.

5. An apparatus in accordance with claim 4, wherein said conveying means includes a pusher which is capable of reciprocating between said pair of rails in parallel thereto and pushing the lead-frame along the rails to transfer it to the following process.

6. An apparatus in accordance with claim 4, wherein one of the pair of rails is movable to and from the other and the position of a plurality of movable guides is adjustable longitudinally.

7. An apparatus in accordance with claim 1, wherein said separator unit includes a separator supported eccentrically and formed with grooves which are in parallel to each other axially and engaged to the upper edge of the first lead-frame aligned on the stocker, and a means to rotate the separator, which rotates to partly separate the upper edge of the first lead-frame from the succeeding lead-frame.

8. An apparatus in accordance with claim 3, wherein said chuck unit includes a second shaft supported rotatably on the chuck base and extending in parallel to the rails,
   at least one chuck pawl comprising an upper chuck mounted on the second shaft adjustably axially, and a lower chuck facing with the upper chuck and mounted on the chuck base adjustably in the axial direction of the second shaft,
   means to rotate the second shaft for selectively contacting or separating the upper and lower chucks,
   a swing lever extending and traversing said pair of rails and coupled to the first shaft slidably longitudinally at one end, and holding said chuck base adjustably longitudinally at the other end,
   means for rotating the first shaft to swing the swing lever, and
   means for advancing and retreating the lever longitudinally.

* * * * *

UNITED STATES PATENT AND TRADEMARK OFFICE
CERTIFICATE OF CORRECTION

PATENT NO.    :  4,776,743

DATED         :  October 11, 1988

INVENTOR(S)   :  Hideo Kimura

It is certified that error appears in the above-identified patent and that said Letters Patent is hereby corrected as shown below:

Column 7, line 36, (Claim 3, line 2,) "support" should read --stopper--.

Signed and Sealed this

Twenty-first Day of February, 1989

*Attest:*

DONALD J. QUIGG

*Attesting Officer*    *Commissioner of Patents and Trademarks*